C. R. NIJSEN.
TRAIN BRAKE.
APPLICATION FILED DEC. 24, 1913.
1,092,116.
Patented Mar. 31, 1914.
2 SHEETS—SHEET 2.
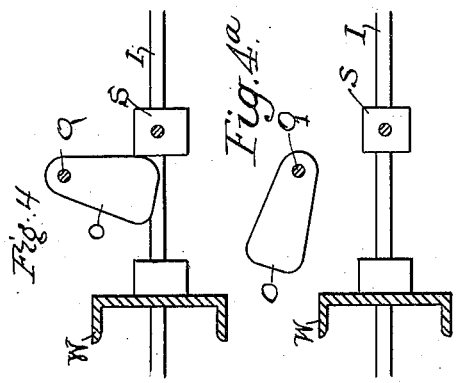
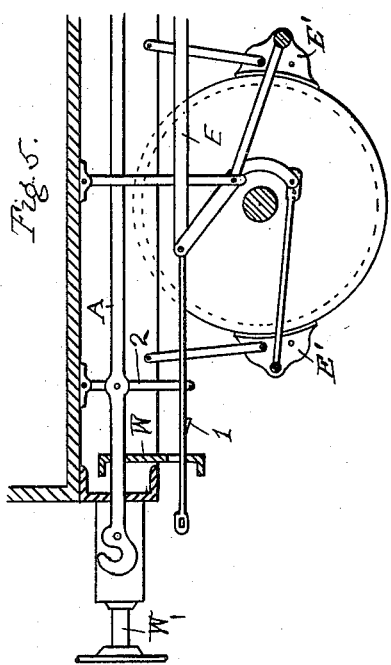
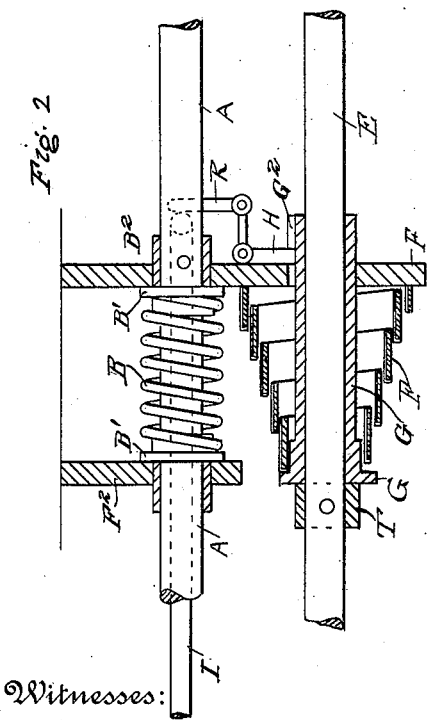
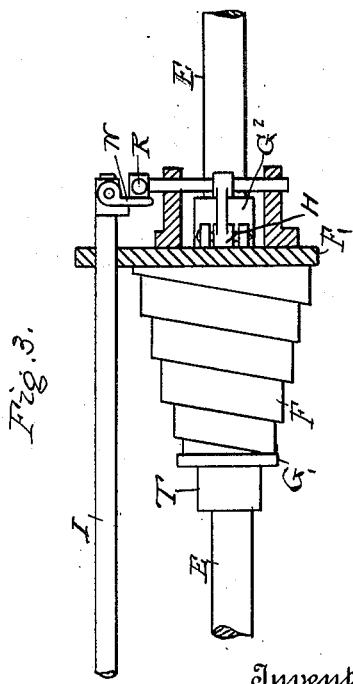
Witnesses:
Inventor
Cornelis Robert Nijsen
By his Attorneys

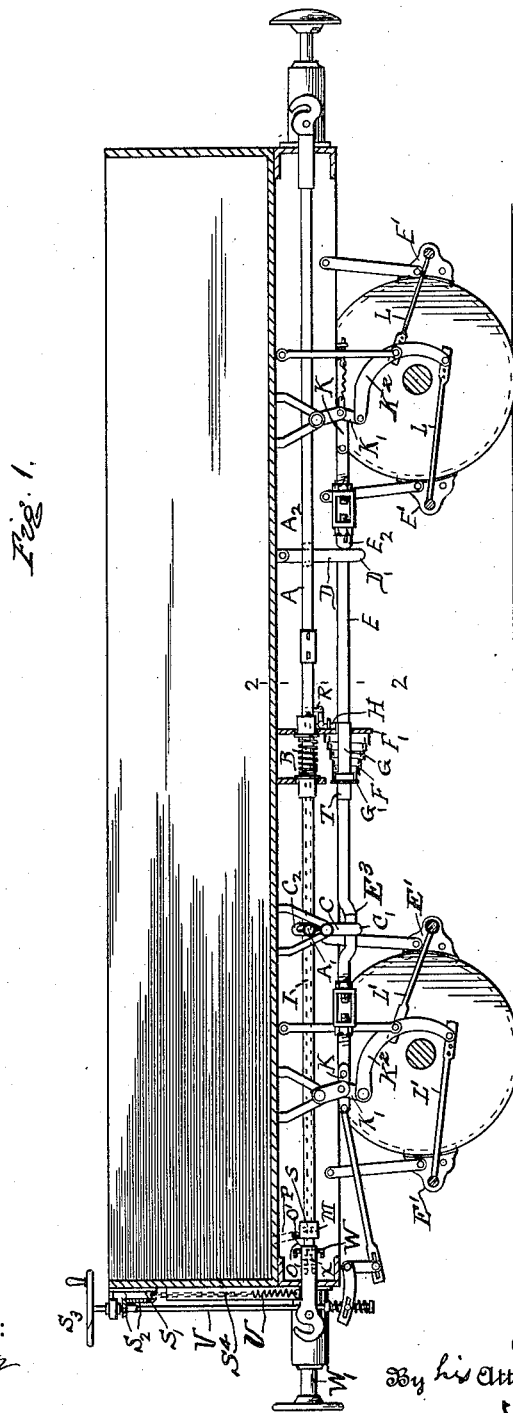

UNITED STATES PATENT OFFICE.

CORNELIS ROBERT NIJSEN, OF ROTTERDAM, NETHERLANDS.

TRAIN-BRAKE.

1,092,116.  Specification of Letters Patent.  Patented Mar. 31, 1914.

Application filed December 24, 1913. Serial No. 808,558.

*To all whom it may concern:*

Be it known that I, CORNELIS ROBERT NIJSEN, a subject of the Queen of the Netherlands, residing at Rotterdam, Netherlands, have invented certain new and useful Improvements in Train-Brakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to train brakes, particularly to brakes for freight trains and the object of my invention is to provide an automatic self-contained brake system for each car, in which (1) the action of the brake is totally independent of the direction of travel of the cars (2) the brake is released during travel, until the speed of the train is slackened by braking the engine, (3) the brake is released as soon as the train is moved in either direction.

In the accompanying drawings, Figure 1 is a longitudinal section through a freight car provided with a brake system embodying, in one form, the present invention; Fig. 2 is a longitudinal vertical section through the brake spring and related parts; Fig. 3 is a longitudinal horizontal section of the same, with the pull rod and pull spring omitted; Fig. 4 is an elevation of a detail; Fig. 4$^a$ is another view of the same showing the parts in position for hand braking; Fig. 5 is a partial longitudinal section corresponding to Fig. 1, showing a modified construction.

Referring to the drawings, I provide under the pull rod A and parallel thereto, a brake rod E, which actuates the brake blocks E$^1$ through the links K, K$^1$, K$^2$, L and L$^1$. The braking force is supplied by the spring F which surrounds the brake rod E and bears at one end against a rigid cross beam F$^1$ and at the other end against the head G$^1$ of the sleeve bush G, (Fig. 2) through which the brake rod is slidable. The head G$^1$ of the bush bears against the collar T pinned to the brake rod. During braking, the expansion of the spring F pushes against the collar T and forces the brake rod E to the left, thus applying the brake blocks to the wheels.

In order to hold the brakes in off position, I provide a locking pawl H, (Figs. 2 and 3) adapted to engage a projection G$^2$ on the bush G and thus prevent the brake spring F from expanding. This pawl is controlled to effect its release upon the compression of the bumpers W$^1$ when the train slackens speed. To this end I pivot the upper end of the locking pawl H to the horizontal arm of the bell crank lever R. The vertical arm of the latter lies in the path of the pawl N at one end of the control rod I arranged parallel to the pull rod E. The other end of this control rod extends through the cross beam W connecting the buffer rods and is subjected to the action of a spring X coiled thereon between its head and the cross beam W to force the rod to the left. A collar S is pinned to the rod I at a short distance from the cross beam W, while a bearing piece O, pivoted on the axis O$^1$, is normally interposed between this collar and the cross beam W. Now when the buffers W$^1$ are compressed the cross beam W is moved to the right and pushes the rod I in the same direction. Inasmuch as the pawl N (Fig. 3) is engaged with the upright arm of the bell crank lever R, the latter is tilted on its axis and the horizontal arm lifts the locking pawl H from its engagement with the projection G$^2$ on the brake-lever bush G. The brake spring F is consequently free to expand and apply the brake shoes.

The brakes are freed and the spring F compressed and reset by the movement of the brake rod E to the right. To secure this, an operative connection between the pull rod A and the brake rod E is established through the two levers C and D in such manner that on the movement of the pull rod in either direction the brake rod is moved to the right. Thus the lever C acts as a lever of the first class, being pivoted on a bracket at a point between the two rods, and provided in its upper portion with a slot C$^2$ in which works a pin A$^1$ on the rod A while its lower arm C$^1$ bears upon a lug E$^3$ lying to its right. The lever D is of the third class, being pivoted to the bottom of the car, passing at $A^2$ through a slot in or lugs on the rod A and bearing at its lower end $D^1$ on the left hand face of the stop $E^2$ on the brake rod E.

The movement of the pull rod may be effected either by direct pull thereon through the coupling hooks, or through the buffers $W^1$. In the latter case the operative connection is established by collars M (Fig. 1) pinned on rod A and against which the cross beam W is driven as the buffers are further pushed in. The same movement pushes the control rod I so far to the right that the pawl N passes out of the way of the vertical arm of bell crank lever R and consequently the locking pawl H is free to fall into engagement with the projection $G^2$ on the bush G thus again locking the brake spring against expansion. As the buffers expand again they draw the rod I with them (through cross beam W and spring X) so that the pawl N rides over the upright arm of lever R and takes up its actuating position (Fig. 3) once more. Obviously if the movement of the pull rod A is directly effected by the advance of the engine without further compression of the buffers, the latter expand and the control rod I moves to the left leaving the locking pawl H free to drop into engagement with the brake spring bush. The brake is thus automatic in its operation. To permit also of its being set by hand, I provide a hand lever for freeing the locking pawl H. This is readily accomplished by means of a hand lever P (Fig. 1) on the axis $O^1$ of the bearing block O. If the latter is moved to the right by the lever P, the control rod I is shifted to the right, thus lifting the locking pawl H through the bell crank R and the brake spring is free to expand and apply the brake shoes.

So long as the bearing piece O is maintained lifted as in Fig. $4^a$, the buffers and related parts have no effect on the control rod I and consequently if the bearing piece is moved into position Fig. $4^a$ while the brake spring is compressed and locked by the pawl H, it is necessary to operate the brake by hand. To this end, I provide the link connections shown in Fig. 1, between the brake rod E and the screw spindle V of the hand wheel $S^3$. The rotation of the hand wheel pulls rod E to the left, in which direction it is free to move through the bush G by reason of the fact that the collar T bears freely against the bush G. The brakes are thus directly applied by hand power. They are returned to off position by the coil spring U, which pulls down the chain $S^4$ wound up on the chain wheel $S^1$ during braking, and thus rotates the latter and through the bevel gears $S^2$, the rod V which returns the braking lever system to off position.

In Fig. 5 an arrangement is shown for increasing the braking action through the agency of the buffer springs. Here the brake rod E is prolonged and extended through a hole in the buffer cross beam W. A catch 1 is formed on the rod E so that when the latter moves to the left on braking, the catch 1 passes through and engages the cross beam W. As soon as the buffers are eased up by the check of speed following preliminary braking, they expand and in doing so tend to draw the cross bar W to the left. The rod E being engaged by the cross bar, however, is drawn with it and the pressure of the buffer springs is thus added to that of the brake spring in applying the braking shoes. The catch is disengaged on the release of the brakes, since it is necessary to effect the latter, that the pull rod be moved in one direction or the other and this lifts the end of the rod E through the link 2 attached to the pull rod A and engaging the rod E, as shown. With the end of the rod lifted the beam W is free to move out of engaging position with relation to the catch 1.

Various other connections than those shown will readily suggest themselves, by which the essential features of the present invention are attained.

I claim as my invention—

1. A train brake comprising a brake rod, a spring for displacing the same into braking position, a pull rod movable parallel to the brake rod, an operative connection between the pull rod and brake rod for moving the latter against the action of its spring on the longitudinal displacement of said pull rod in either direction, means for holding said spring in compressed condition, movable buffers and means controlled thereby for freeing said holding means to permit the brake spring to expand.

2. A train brake comprising a brake rod, a spring for displacing the same into braking position, a pull rod movable parallel to the brake rod, an operative connection between the pull rod and brake rod for moving the latter against the action of its spring on the longitudinal displacement of said pull rod in either direction, means for holding said spring in compressed condition, movable buffers and means controlled thereby for freeing said holding means to permit the brake spring to expand, together with an operative connection between said buffers and pull rod for operating the latter on the strong compression of said buffers.

3. A train brake comprising a brake rod, a spring for displacing the same into braking position, a pull rod movable parallel to the brake rod, an operative connection between the pull rod and brake rod for moving the latter against the action of its spring on the longitudinal displacement of said pull rod in either direction, a locking pawl to engage and hold said brake spring in compressed condition, lever means controlling said locking pawl, a control rod having a one-way engagement with said lever means, movable buffers and an operative engagement between said control rod and buffers to effect the displacement of said locking pawl on the compression of the buffers to permit the brake spring to expand, substantially as described.

4. A train brake comprising a brake rod, a spring for displacing the same into braking position, a pull rod movable parallel to the brake rod, an operative connection between the pull rod and brake rod for moving the latter against the action of its spring on the longitudinal displacement of said pull rod in either direction, a locking pawl to engage and hold said brake spring in compressed condition, lever means controlling said locking pawl, a control rod having a one-way engagement with said lever means, movable buffers and an operative engagement between said control rod and buffers to effect the displacement of said locking pawl on the partial compression of the buffers, to permit the brake spring to expand, and upon further compression of said buffers to free said locking pawl, whereby the latter is free to fall into locking engagement with the brake spring on the compression of the latter, substantially as described.

5. A train brake comprising a brake rod, a spring for displacing the same into braking position, a pull rod movable parallel to the brake rod, an operative connection between said pull rod and brake rod for forcing the latter against the action of its spring on the longitudinal displacement of the pull rod in either direction, a locking pawl for holding said spring in compressed condition, a control rod having a one-way operative engagement with said locking pawl, movable buffers engaging said control rod on partial compression to displace the same and thereby free the locking pawl and breaking the engagement between said control rod and locking pawl on further compression of said buffers to permit said locking pawl to move into locking position, together with an operative engagement between said pull rod and buffers on said further compression of the latter serving to displace said pull rod and thus recompress the braking spring, substantially as described.

6. In an automatic brake of the character described, a braking spring, a locking pawl for holding the spring in compressed condition, a control rod having a one-way operative engagement with said locking pawl, movable buffers and an operative engagement between the latter and the control rod for actuating the latter to free the locking pawl on the partial compression of the buffers and to release said pawl on the further compression of the buffers whereby said pawl may move into engagement with the brake spring, for the purpose described.

7. In an automatic brake of the character described, a braking spring, a locking pawl for holding the spring in compressed condition, a control rod having a one-way operative engagement with said locking pawl, movable buffers and an operating engagement between the latter and the control rod for actuating the latter to free the locking pawl on the partial compression of the buffers and to release said pawl on the further compression of the buffers whereby said pawl may move into engagement with the brake spring, in combination with a bearing piece interposed between said buffers and control rod, and manually controlled means for displacing said bearing piece to shift said control rod in a direction to release said locking pawl, substantially as described.

8. In an automatic brake of the character described, a braking spring, a locking pawl for holding the spring in compressed condition, a control rod having a one-way operative engagement with said locking pawl, movable buffers and an operative engagement between the latter and the control rod for actuating the latter to free the locking pawl on the partial compression of the buffers and to release said pawl on the further compression of the buffers whereby said pawl may move into engagement with the brake spring, in combination with a bearing piece interposed between said buffers and control rod and manually operated means for moving said bearing piece out of its interposed position whereby the compression of the buffers is without effect upon said control rod, substantially as described.

9. In an automatic brake of the character described, a brake rod, a spring for displacing the same into braking position, a pull rod movable parallel to the brake rod, an operative connection between the pull rod and brake rod for moving the latter against the action of its spring on the longitudinal displacement of said pull rod in either direction, movable buffers, a collar fixed on said pull rod and a member moving with the buffers and engaging said collar on the heavy compression of said buffers to displace said pull rod and effect the compression of the brake spring, substantially as described.

10. In an automatic brake of the character described, a brake rod, a spring abutment thereon, a brake spring coiled on said rod and freely thrusting against said abutment, a locking pawl for holding said spring in compressed position, and manual means for displacing said rod while the brake spring is maintained by said pawl in compressed position.

11. In an automatic brake of the character described, a brake rod, a buffer, and means for operatively engaging the same on partial compression of the buffer, whereby the expansion of the buffer after compression serves to move the brake rod into braking position, substantially as described.

12. In an automatic brake of the character described, a brake rod, a buffer, and means for operatively engaging the same on partial compression of the buffer, whereby the expansion of the buffer after compression serves to move the brake rod into braking position, in combination with a longitudinally displaceable pull rod and a connection between said pull rod and brake rod operative to free the latter from its engagement with the buffer on the longitudinal displacement of said pull rod, substantially as described.

In testimony whereof I have signed my name to this specification, in the presence of two subscribing witnesses.

CORNELIS ROBERT NIJSEN.

Witnesses:
ED. REEVS,
J. N. ENO.

Copies of this patent may be obtained for five cents each, by addressing the "Commissioner of Patents, Washington, D. C."